Dec. 27, 1927.  
H. E. WEDGE  
1,654,393  
WEATHER PROTECTOR FOR MOTOR VEHICLE DRIVERS  
Filed Nov. 26, 1926
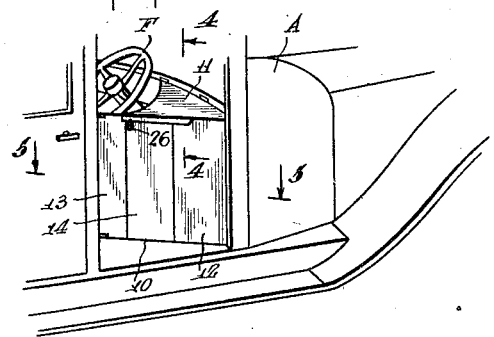
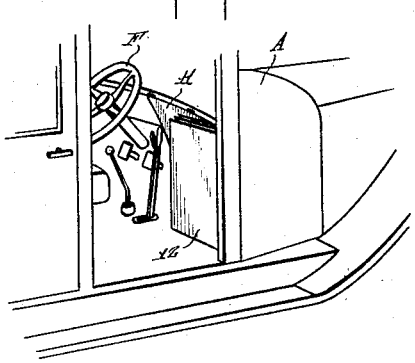
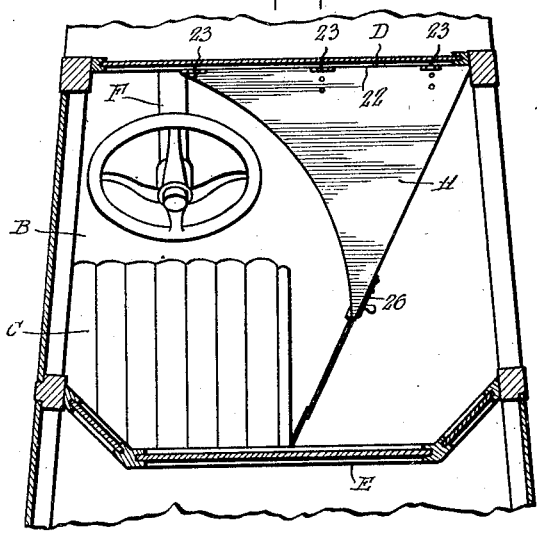
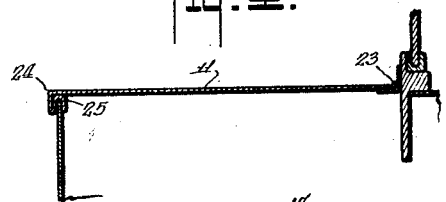
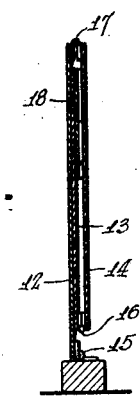
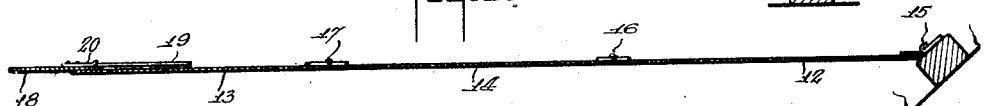
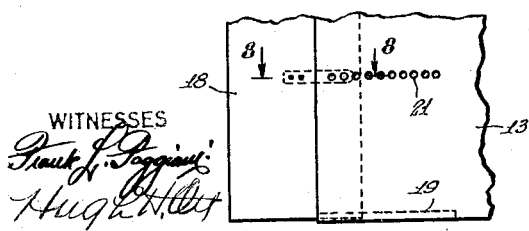
WITNESSES
INVENTOR  
*Henry E. Wedge*  
BY  
ATTORNEY Patented Dec. 27, 1927.

1,654,393

UNITED STATES PATENT OFFICE.

HENRY E. WEDGE, OF NEW YORK, N. Y.

WEATHER PROTECTOR FOR MOTOR-VEHICLE DRIVERS.

Application filed November 26, 1926. Serial No. 150,816.

This invention relates to accessories for motor vehicles and has particular reference to a weather protector or shield which is especially designed for installation on taxi cabs, town cars or other motor vehicle of this general type, to afford protection to the driver in cold weather.

In motor vehicles of the type set forth and particularly taxi cabs, the driver is exposed more or less to the elements and especially to cold and wind due to the fact that one side of the driver's compartment is entirely open to provide means for conveniently carrying trunks and baggage when requested. It thus follows that drivers of such vehicles are subjected for long periods of time, especially in cold weather, to the discomfort incident to severe cold and wind.

The present invention therefore aims for its principal object to provide as an accessory an improved protector shield which may be readily applied to a vehicle and which when so applied constitutes means for effectually protecting the driver from wind and cold while accumulating and retaining the heat radiated from the motor.

The invention furthermore contemplates a weather protector or shield which is quickly foldable to an out-of-the-way position when not in use or when it is necessary to carry trunks or baggage.

Other objects of the invention reside in the simplicity and durability of the construction of the protector, the economy with which the same may be produced and installed and the general efficiency obtained therefrom.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a fragmentary perspective view of a motor vehicle illustrating the improved protector or shield in its active position;

Figure 2 is a similar view illustrating the same in its folded or inactive position;

Figure 3 is a sectional plan view through the driver's compartment of the vehicle illustrating the protector or shield in its active position;

Figure 4 is a fragmentary sectional view taken approximately on the line 4—4 of Figure 1;

Figure 5 is a fragmentary sectional view taken approximately on the line 5—5 of Figure 1;

Figure 6 is a plan view of the folded position of the vertical strip;

Figure 7 is a detail fragmentary side view of the free end of the vertical strip illustrating the adjustable section;

Figure 8 is a horizontal sectional view taken approximately on the line indicated 8—8 of Figure 7.

Referring to the drawings by characters of reference, A designates the motor vehicle which, in the present instance, is illustrated as a taxi cab, B being the driver's compartment having the driver's seat C and the dash D.

The protector or shield constituting the present invention includes a vertical strip, panel or wall 10 which extends from the dash to the rear wall E of the driver's compartment preferably to a point closely adjacent the driver's seat C, the strip panel or wall 10 being attached to the vehicle at the dash. The strip, panel or wall 10 is of a height to extend from the floor to a point approximately at or slightly above the waist line of the seated driver. The protector further includes a horizontal top section 11 which is of substantially triangular formation having one of its edges secured to or contacting with the upper edge of the strip 10 from the point of securement of the strip 10 to the dash or front to the driver's compartment and terminating at a point in advance of the rear wall E. Another edge of the top section 11 is secured to or contacts with the dash D, extends inwardly toward the driver's seat to a point substantially in alignment with the steering column F, while the remaining free edge extends between the dash and the strip 10.

In the particular form disclosed the strip 10 and the top section 11 are preferably constructed of sheet metal or other material held rigid by frame work. In this form the strip 10 includes front, rear and intermediate sections 12, 13 and 14. The former, namely the section 12, is connected at its forward edge by a hinge or hinges 15 to the front right side of the driver's compartment where the vehicle is of the usual left-hand drive type, so that the same may swing outwardly and rearwardly from a position parallel to the front of the driver's compartment. The intermediate section 14 is connected at its front edge by a hinge or hinges 16 to the front section 12 to swing inwardly with respect thereto, and the rear section 13 is connected at its forward edge by a hinge or hinges 17 to the rear edge of the intermediate section 14 to swing inwardly along side of or parallel to the section 14. Due to the fact that the driver's compartment in the different makes of taxi cabs or other vehicles vary in size and to compensate for said variations, an adjustable section 18 is mounted for sliding movement on the inner face of the rear section 13 adjacent its rear free end to be adjustably projected from or retracted within the confines of said rear section 13. The adjustable section is guided in its sliding movement in any suitable manner, but as disclosed it is preferred to form a guide flange 19 at the lower and upper edges of the rear section 13. In order to provide means for maintaining the adjustable section 18 in its relatively adjusted relation, a suitable spring catch 20 is provided thereon which is normally projected and which is selectively engaged in one of a plurality of keeper openings 21 formed in the rear section 13.

In the preferred embodiment of the invention as illustrated, the top section 11 which is heretofore explained as of substantial triangular configuration has its front edge 22 connected by hinges 23 to the dash so that the same may swing upwardly and downwardly. The free side edge 24 is provided for a portion of its length between the free rear end and front end with an embracing guide flange 25 designed to embracingly engage over the upper edge of the intermediate section 14 and a portion of the front and rear sections 12 and 13 so as to lock the sections in an aligned rigid position. This flange 25 is preferably formed integral with the top section and is of substantial inverted U-shaped configuration to wedge over the upper edge of the section for preventing rattling when the vehicle is in motion. In order to retain the top section 11 in associated engaged relation with the sections of the vertical strip 10 a suitable latch 26 is provided.

In use and operation the device when installed and in active use as illustrated in Figures 1 and 3, shields and protects the driver from a point slightly above the waist downwardly against wind, cold and driving rain, sleet or snow, while the top section 11 combines therewith to retain heat radiated from the motor within the driver's compartment. When the device is unnecessary, or in the case of a taxi cab where it is desired to carry trunks or baggage in the driver's compartment the protector may be readily folded to the out-of-the-way position illustrated in Figure 2 by releasing the catch 26, raising the top section 11 until the guide 25 disengages the upper edge of the sections 12, 13 and 14 of the strip 10. The strip 10 is then swung slightly outward to clear the top section 11 which is lowered to a vertical depending position as illustrated in Figure 2 after which the section 13 is folded inwardly along side of and parallel to the section 14 and the folded sections 13 and 14 are then swung inwardly along side of and parallel to the section 12. The three sections are then swung on the hinges 15 inwardly and forwardly to a position substantially parallel to the front of the driver's compartment and covering the depending top section 11. These operations require but a comparatively few moments as does the operation of setting the device up for active use.

From the foregoing it will thus be seen that a weather protector of the class described and for the purposes set forth, has been devised.

What I claim is:

1. A weather protector of the class described comprising a shield strip hinged to the front of the driver's compartment and swingable to extend from its point of connection with the front, to and in engagement with the rear of the driver's compartment, and a horizontal strip at the upper edge of said shield strip, extending from the upper edge thereof inwardly along the dash.

2. A weather protector of the class described comprising a shield strip hinged to the front of the driver's compartment and swingable to extend from its point of connection with the front, to and in engagement with the rear of the driver's compartment, and a horizontal strip at the upper edge of said shield strip, extending from the upper edge thereof inwardly along the dash, said shield strip being of a height to extend from the floor to a point slightly above the waist line of the seated driver.

3. A weather protector of the class described comprising a shield strip hinged to the front of the driver's compartment and swingable to extend from its point of connection with the front, to and in engagement with the rear of the driver's compartment, said shield being of a height to extend from the floor to a point slightly above the waist line of the seated driver, the said shield strip including hingedly connected sections and a top section of substantially triangular configuration hinged at its forward edge to the dash at a point slightly above the plane of the upper edge of the shield strip and having means on its outer edge for engaging the intermediate section and portions of the front and rear sections to support the top section horizontally and to maintain the hingedly connected sections of the shield strip in extended aligned relation.

4. A weather protector of the class described comprising a shield strip hinged to the front of the driver's compartment and swingable to extend from its point of connection with the front to and in engagement with the rear of the driver's compartment, said shield being of a height to extend from the floor to a point slightly above the waist line of the seated driver, the said shield strip including hingedly connected sections and a top section of substantially triangular configuration hinged at its forward edge to the dash at a point slightly above the plane of the upper edge of the shield strip and having means on its outer edge for engaging the intermediate section and portions of the front and rear sections to support the top section horizontally and to maintain the hingedly connected sections of the shield strip in extended aligned relation, interengageable retaining means on the top section and the shield strip for holding the top section and shield strip in juxtaposition.

HENRY E. WEDGE.